(12) United States Patent
Ikonen et al.

(10) Patent No.: US 9,077,437 B2
(45) Date of Patent: Jul. 7, 2015

(54) FRONT-END CIRCUIT

(75) Inventors: Pekka Ikonen, Espoo (FI); Juha Ellä, Halikko (FI); Pasi Tikka, München (DE)

(73) Assignee: EPCOS AG, Munich (DE)

( * ) Notice: Subject to any disclaimer, the term of this patent is extended or adjusted under 35 U.S.C. 154(b) by 107 days.

(21) Appl. No.: 13/997,925

(22) PCT Filed: Dec. 27, 2010

(86) PCT No.: PCT/EP2010/070765
§ 371 (c)(1),
(2), (4) Date: Sep. 10, 2013

(87) PCT Pub. No.: WO2012/089236
PCT Pub. Date: Jul. 5, 2012

(65) Prior Publication Data
US 2013/0344820 A1    Dec. 26, 2013

(51) Int. Cl.
*H04B 1/44* (2006.01)
*H04B 1/00* (2006.01)

(52) U.S. Cl.
CPC .................. *H04B 1/44* (2013.01); *H04B 1/006* (2013.01); *H04B 1/0064* (2013.01)

(58) Field of Classification Search
CPC .......... H04B 1/18; H04B 1/0458; H04B 1/28; H04B 1/30; H04B 1/403; H04B 1/405; H04B 1/48; H04B 1/40; H04B 1/109; H04B 1/38; H04B 1/005; H04B 1/44; H04B 1/52; H04B 1/525; H04B 1/581; H04B 5/0062

USPC ........................................................ 455/78
See application file for complete search history.

(56) References Cited

U.S. PATENT DOCUMENTS

2007/0184813 A1 * 8/2007 Pascht et al. .................. 455/349

FOREIGN PATENT DOCUMENTS

| DE | 102008053296 A1 | 4/2010 | |
|----|----|----|----|
| EP | 0300261 A1 | 1/1989 | |
| EP | 0680161 A1 | 11/1995 | |
| WO | 2009/155966 A1 | 12/2009 | |
| WO | 2010/052150 A1 | 5/2010 | |
| WO | WO 2010052150 A1 * | 5/2010 | ............... H01Q 5/00 |
| WO | WO-2010105272 | 9/2010 | |

* cited by examiner

*Primary Examiner* — Ajibola Akinyemi
(74) *Attorney, Agent, or Firm* — McDermott Will Emery LLP

(57) ABSTRACT

The present invention concerns a front-end circuit (FEC) that is connectable to at least two radiators (RAD1M, RAD1D), wherein the front-end circuit (FEC) comprises sub-circuits (SC) and each sub-circuit (SC) is associated to one radiator (RAD1M, RAD1D). Further, each sub-circuit (SC) comprises a signal path (SP), an antenna port (AP) that is electrically coupled to the signal path (SP) and connectable to the radiator (RAD1M, RAD1D), a grounding port (GP) that is connectable to the radiator (RAD1M, RAD1D), a ground termination circuit (GTC), and a grounding switch (GS) that is electrically coupled to the grounding port (GP) and to the grounding termination circuit (GTC).

13 Claims, 6 Drawing Sheets

FRONT-END CIRCUIT

The present invention concerns a front-end circuit that is connectable to at least two radiators. The front-end circuit provides mobile communication devices—such as mobile phones—with an improved antenna performance.

Mobile communication devices generally utilize radio frequency signals for communication with remote devices such as other mobile communication devices or base stations. Modern mobile communication devices have to fulfill many requirements. Among these are multi-band operations and multi-mode operations. Modern mobile communication devices usually are able to transmit and/or receive radio frequency signals towards or from a plurality of transmitters or receivers, respectively. Especially communication devices that operate in different frequency bands in some cases comprise a plurality of different antennas in order to be operable in different frequency bands. Such communication devices may comprise rod antennas or patch antennas, like PIFAs (Planar Inverted F-Antenna) or PILAs (Planar Inverted L-Antenna). As antennas are radio frequency components that interact with radio frequency signals, detrimental interaction between different antennas seems generally unavoidable.

The number of cellular frequency bands that a future multi-mode and multi-band handset must support is increasing to seven with the emerging of long-term evolution (LTE). Not only has the handset to support cellular transmission and reception over frequencies ranging from approximately 700 MHz to 2700 MHz, in addition to this, at minimum two simultaneously operating cellular radiators are required to the MIMO (Multiple Input Multiple Output) RX requirement of LTE. In addition to the above, new connectivity protocols are constantly emerging, often with the particular requirement to implement additional radiators in the handset to support these protocols.

The volume reserved for the radiators in a handset is not expected to increase in the future. Thus, designing an increasing number of compact, efficient and inter-operable radiators that can be matched over a wide range of frequencies becomes increasingly challenging. It is clear that design methods only focusing on shaping the radiators and/or modifying the input matching networks have limitations when it comes to such flexible impedance matching. However, adding discrete matching and termination circuitry for several radiators in the handset becomes impractical due to printed wiring board (PWB) area consumption and cost.

WO2010/052150 discloses a front-end circuit with the possibility to connect the feed pin of not operating radiators to different impedance elements. This is shown to decrease in some cases the detrimental interaction between the radiators leading to improved total efficiency for the operating radiator.

WO2009/155966 A1 describes a radiator wherein the radiator can be connected to a physical grounding point that is connected to different impedance elements and to an antenna point. Details of the implementation or integration of the termination functionality are not discussed.

It is an object of the present invention to provide a front-end circuit for use with at least two antennas in a respective mobile communication device with an improved antenna performance and without significantly increasing the consumed PWB area.

A front-end circuit according to claim 1 and a method for driving the front-end circuit according to claim 12 provide solutions for this object. The dependent claims disclose advantageous embodiments of the present invention.

A front-end circuit according to the present invention is connectable to at least two radiators, wherein the front-end circuit comprises sub-circuits and each sub-circuit is associated to one radiator. Further, each sub-circuit comprises a signal path, an antenna port that is electrically coupled to the signal path and connectable to the radiator, a grounding port that is connectable to the radiator, a grounding termination circuit and a grounding switch that is electrically coupled to the grounding port and to the grounding termination circuit.

Accordingly, the radiator is connectable to the grounding port and to the antenna port. During operation of the radiator, the antenna port is connected to the signal path, providing the signal to the radiator. At the same time, the radiator can be connected to the grounding port and via the grounding switch to the grounding termination circuit. The ground termination circuit allows adjusting the impedance of the radiator during operation of the radiator.

Compared to the prior art, the functionality to terminate operating radiators with different, possibly user-defined, impedance elements is now implemented into the RF-end module. This integration reduces the number of impedance elements required by the termination. Therefore, the consumed area of the PWB is not increased by the present invention.

Further, each sub-circuit of the front-end circuit can comprise an antenna termination circuit and an antenna switch that is electrically connected to the antenna port. The antenna switch can connect the antenna port to one of the signal paths or to the antenna termination circuit. When a radiator is in use, the corresponding antenna switch will electrically connect the antenna port to the signal path in which radio frequency signals propagate to or from the antenna. However, if an antenna is not in use, meaning that the corresponding radiator may not transmit or receive radio frequency signals, the antenna switch will connect the antenna port to the antenna termination circuit. The inventors have found that detrimental detuning of other used radiators by this unused inactive radiator can be reduced or even prevented, if the radiator is connected to an antenna termination circuit.

Furthermore, the ground termination circuit can comprise at least two termination paths, each termination path having a different impedance and the grounding switch can connect the grounding port to one of the termination paths, respectively, at a given time. Therefore, the radiator has different impedances for different configurations of the grounding switch. In LTE, a main antenna and a diversity antenna are operating simultaneously. To ease the impedance matching of the operating main and diversity radiators over a certain frequency band, the corresponding grounding switches can connect the radiator grounding ports to user-defined impedance elements and set the desired radiator impedance.

The actual ground termination circuit can be implemented in several ways. For example, the grounding switch can connect the grounding port to a ground termination circuit comprising an impedance element selected from a resistance element, a capacitive element, an inductive element and an LCR-circuit. Further, the ground termination circuit can provide one or more individually selectable states chosen from an open state and a short-terminated state and an individual-terminated state, wherein in the individual-terminated state the ground switch electrically connects the impedance element to the grounding port.

Moreover, the ground termination circuit can comprise an LCR network having an arbitrary network topology wherein the LCR network is implemented with discrete components or transmission lines. One or several of the discrete components or the transmission lines can be tunable. Accordingly, the LCR network is tunable in this case.

Further, any of the impedance elements of the filters already implemented in a front-end module can be embodied as part of the ground termination circuit.

Further, the ground termination circuit can comprise additional switches in a cascade and/or parallel configuration. Each switch can be followed by another switch or by one of an open path, a short-terminated path or an individual terminated path comprising an impedance element.

Furthermore, any termination circuit formed by combining the above-described implementations is possible as well.

The wording "open state" or "open path" denotes a termination whose absolute value of the termination impedance is in principle infinite, i.e. in reality very large. In contrast, the wording "short-terminated state" denotes a termination state of mainly zero impedance. The short-terminated state is in a simple embodiment realized by a direct connection of the grounding port to ground. The open-terminated state is realized by electrically isolating the grounding port from other electric circuit components of the front-end circuit.

In many cases, the most important termination state according to the invention, however, may be the individual-terminated state. The wording "individual-terminated state" denotes a termination state that is characterized by a fixed impedance of finite resistance and finite reactance. The front-end circuit may provide appropriate resistance, capacitive or inductive elements or networks comprising such elements in order to achieve an optimal individual-termination of the antenna port and of the ground port. The front-end circuit may comprise a plurality of different LCR elements or LCR networks and respective switches in order to provide different individual termination states. An optimized termination impedance of the inactive antenna may depend on the frequency and/or the transmission mode of the respective antenna and the precise geometric shape of the radiators.

In one embodiment, the front-end circuit is implemented in a device for wireless applications. The device may be a cellular phone, a smartphone, a Bluetooth device, a GPS receiver (GPS=Global Positioning System), a DVB-T receiver (DVB-T=Digital Video Broadcasting-Terrestrial), or DVB-H receiver (DVB-H=Digital Video Broadcasting-Handheld). In general, the device may be a diversity receiver receiving information additionally to audio information. The device may be an MIMO (Multiple Input Multiple Output) device. In particular, the device may be specified for LTE communication.

The present invention further concerns a method for driving the front-end circuit. The method comprises the steps of determining at least one active radiator, electrically connecting the grounding port which is coupled to the active radiator to a termination path of the ground termination circuit, determining at least one inactive radiator, and electrically connecting the antenna port which is coupled to the inactive radiator to a termination path of the antenna termination circuit.

In one embodiment, the method further comprises the step of consulting a mode table regarding optimal antenna performance. The grounding port of the active antenna and the antenna port of the inactive antenna are coupled to the corresponding termination paths according to the mode table via selecting and setting the according switching state of the respective grounding switch or the respective antenna switch.

Moreover, the grounding port which is coupled to the inactive radiator can be electrically connected to a termination path of the ground termination circuit according to the mode table via selecting and setting the according switching state of the respective grounding switch. In this case, the ground termination circuits can also be utilized with non-operating radiators to further reduce the detrimental interaction between radiators. Accordingly, the ground termination circuit can possibly be combined with the use of the antenna termination circuit.

The present invention will become fully understood from the detailed description given herein below and the accompanying schematic drawings. In the drawings.

Figure 1:
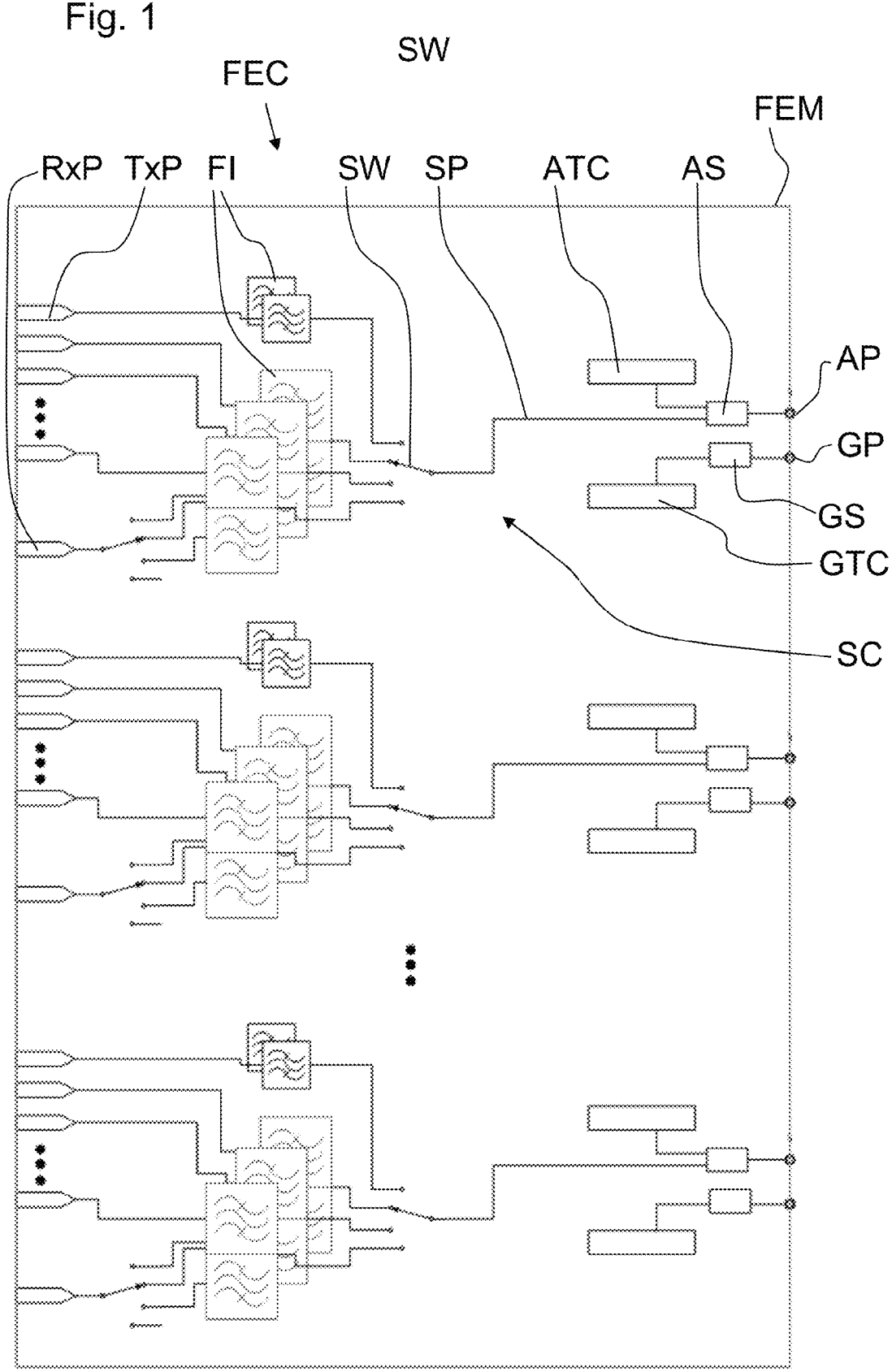
FIG. 1 shows a block diagram of a front-end circuit.

FIG. 1 illustrates circuitry according to the basic idea of the invention. A front-end circuit FEC is comprised within a front-end module FEM. The front-end circuit FEC comprises multiple sub-circuits SC. Each sub-circuit SC corresponds to one radiator RAD.

Each sub-circuit SC comprises an antenna port AP and a grounding port GP. Both ports AP, GP can be electrically coupled to the corresponding radiator RAD. The antenna port AP is connected to an antenna switch AS. The antenna switch AS can connect the antenna port AP either to a signal path SP or to an antenna termination circuit ATC. The grounding port GP is electrically coupled to a grounding switch GS. The grounding switch GS is connected to a ground termination circuit GTC.

When the radiator RAD is transmitting and/or receiving radio signals, the antenna switch AS connects the antenna port AP to the signal path SP. This will be further clarified with the help of an embodiment as shown in FIG. 2.

Figure 2:
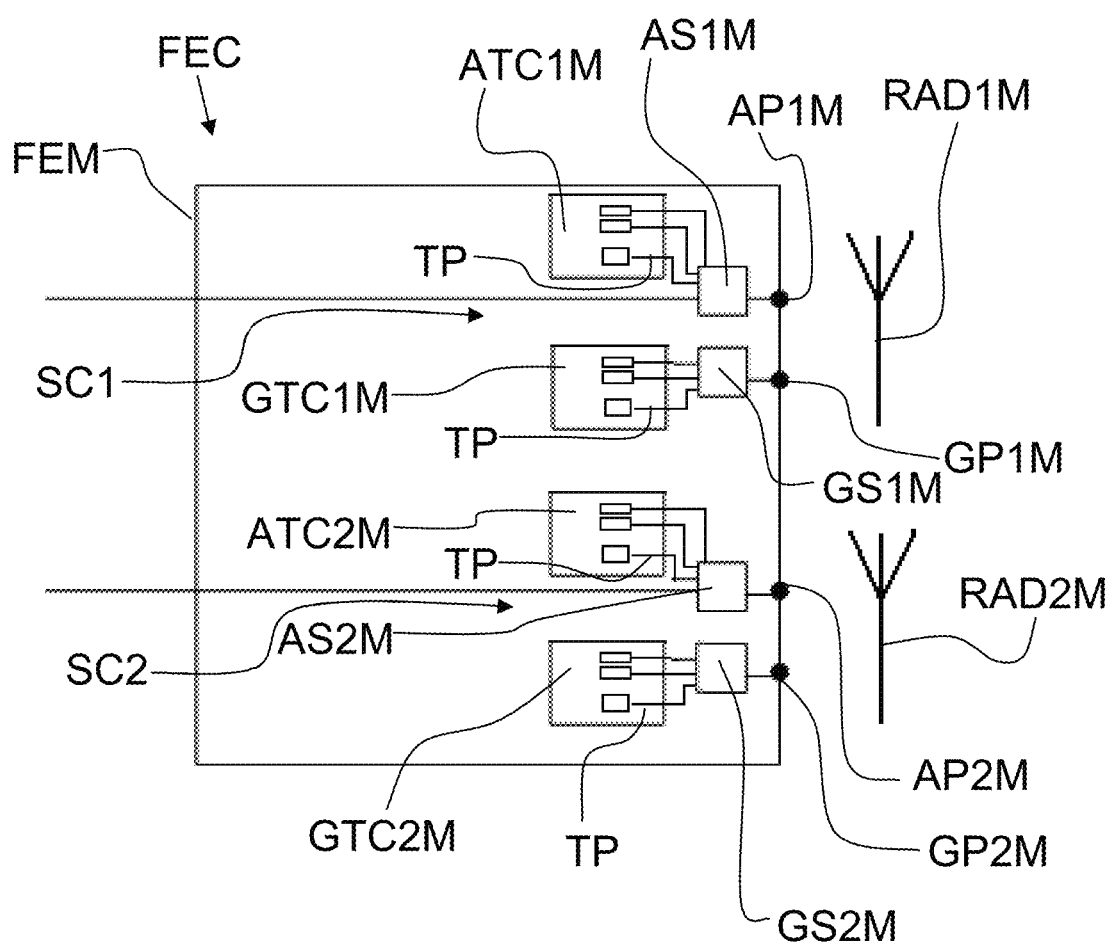
FIG. 2 shows block diagrams of a front-end circuit and corresponding radiators.

FIG. 2 shows the front-end circuit of a handset comprising two main radiators RAD1M, RAD2M. The first main radiator RAD1M is connectable to a first sub-circuit SC1 via a first antenna port AP1M and a first grounding port GP1M. Correspondingly, the second main radiator RAD2M is connectable to a second sub-circuit SC2 via a second antenna port AP2M and a second grounding port GP2M. Each sub-circuit SC1, SC2 comprises the same elements and the same structure as discussed with respect to FIG. 1.

A first radiator RAD1M may be operating in cellular band 5. Correspondingly, the first radiator RAD1M operates in the low frequency bands. The second radiator RAD2M may be operating in cellular frequency band 2, a high-frequency band. During conversation via frequency band 2, the second radiator RAD2M will be operating and the first radiator RAD1M will be inactive. Accordingly, at a given instant, it might be beneficial to connect the first radiator RAD1M to the antenna termination circuit ATC1M using the antenna switch AS1M to minimize the detrimental interaction between the two radiators RAD1M, RAD2M.

Each antenna termination circuit ATC1M, ATC2M comprises multiple termination paths TP. Each termination path TP corresponds to a certain impedance. Accordingly, it can be chosen from several possibilities to terminate the radiator RAD1M, RAD2M via the antenna termination circuits ATC1M, ATC2M.

The ground termination circuit GTC1M, GTC2M can also comprise multiple termination paths TP, each termination path TP corresponding to a certain impedance. The grounding port GP1M, GP2M can be connected via the grounding switch GS1M, GS2M to one of the multiple termination paths TP of the ground termination circuit GTC1M, GTC2M. Thereby, the impedance of a radiator RAD1M, RAD2M can be adjusted. Adjusting the impedance via the ground port GP2M, grounding switch GS2M and grounding termination circuit GTC2M allows adjusting the impedance for operating radiators RAD2M.

The antenna termination circuit ATC1M allows adjusting the impedance of unused, non-operating radiators RAD1M. However, the ground termination circuit GTC2M allows setting the impedance of used, operating radiators RAD2M.

In general, the ground termination circuit GTC2M implemented in the front-end module FEM can be used with operating radiators RAD2M to change the raw impedance seen at the antenna port AP2M. This can improve impedance matching at different frequencies. However, the ground termination circuits GTC1M can also be utilized with non-operating radiators RAD1M to further reduce the detrimental interaction between radiators RAD1M, RAD2M. In this case, the ground termination circuit GTC1M can possibly be combined with the use of the antenna termination circuit ATC1M.

Figure 3:
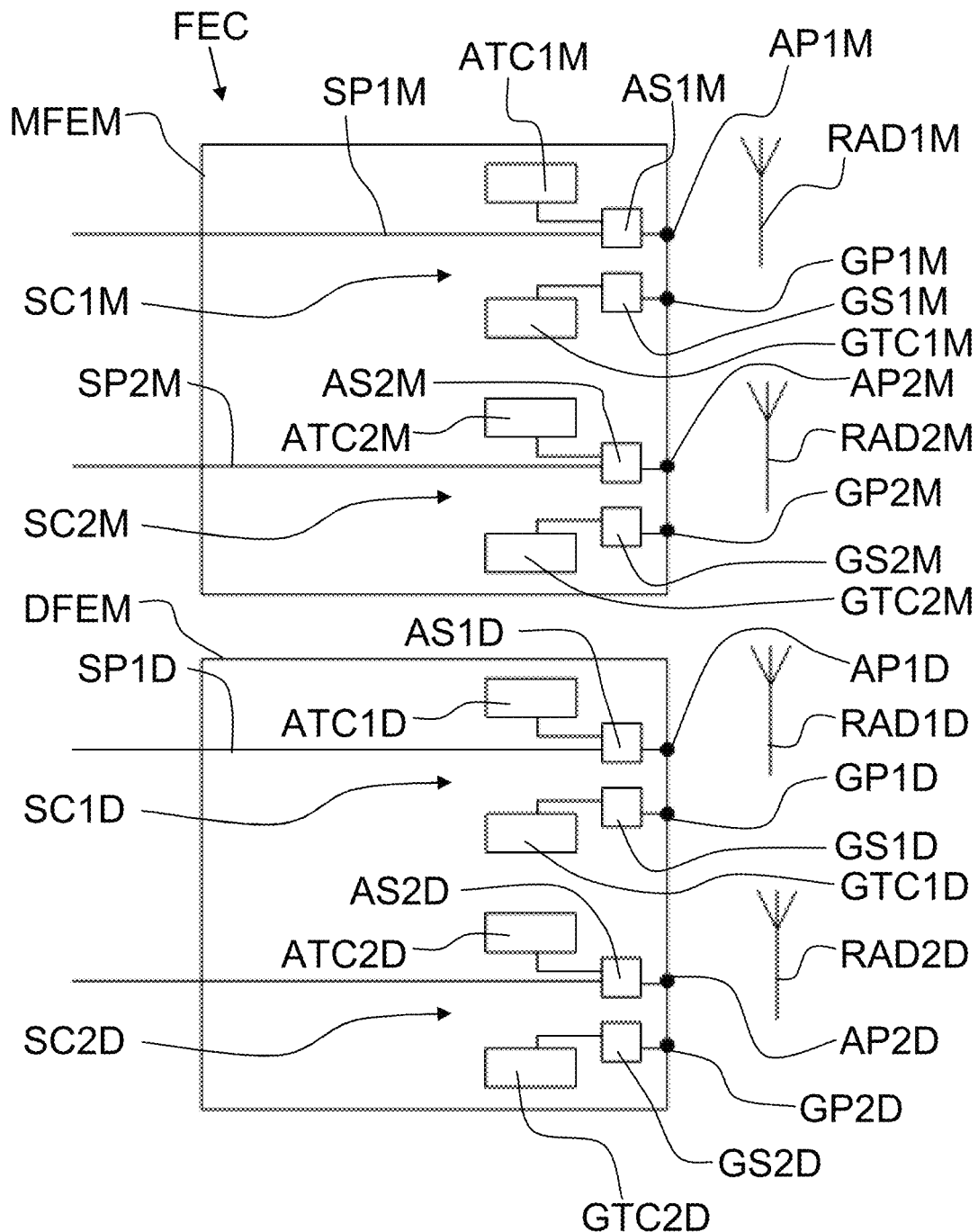
FIG. 3 shows block diagrams of a front-end circuit and corresponding radiators.

FIG. 3 shows a second embodiment of the present invention. Here, the front-end circuit FEC is separated into a main front-end module MFEM and a diversity front-end module DFEM. The main front-end module MFEM comprises two sub-circuits SC1M, SC2M, the first sub-circuit SC1M is connectable to a first main radiator RAD1M. The first main radiator RAD1M corresponds to a low frequency band. The second sub-circuit SC2M is connectable to a second main radiator RAD2M. The second main radiator RAD2M corresponds to a high frequency band. The diversity front-end module DFEM also comprises two sub-circuits SC1D, SC2D. The first sub-circuit SC2D is connectable to a first diversity radiator RAD1D which corresponds to a low frequency band. The second sub-circuit SC2D is connectable to a second diversity radiator RAD2D which corresponds to a high frequency band.

Each radiator RAD1M, RAD2M, RAD1D, RAD2D can be connected to an antenna port AP1M, AP2M, AP1D, AP1D and to a grounding port GP1M, GP2M, GP1D, GP1D. As discussed above, each grounding port GP1M, GP2M, GP1D, GP1D is connected to a grounding switch GS1M, GS2M, GS1D, GS1D and a grounding termination circuit GTC1M, GTC2M, GTC1D, GTC1D. Further, in each sub-circuit SC1M, Sc2M, SC1D, SC2D the antenna port AP1M, AP2M, AP1D, AP1D is connected to an antenna switch AS1M, AS2M, AS1D, AS1D which can connect the antenna port AP1M, AP2M, AP1D, AP1D either to a signal path SP1M, SP2M, SP1D, SP1D or to an antenna termination circuit ATC1M, ATC2M, ATC1D, ATC1D.

The following describes a principal use scenario based on the embodiment as shown in FIG. 3. The front-end circuit FEC is specified for LTE communication. Two of the radiators RAD1M, RAD2M are main radiators that are used both for transmission and reception. Further, one of the main radiators RAD1M covers the cellular low band ranging from approximately 700 to 960 MHz. The second main radiator RAD2M covers the cellular high band ranging from approximately 1700 to 2700 MHz. The same radiator division principle applies also for the diversity radiators RAD1D, RAD2D. One radiator RAD1D is embodied for the cellular low band and the other radiator RAD2D for the cellular high band. However, the diversity radiators RAD1D, RAD2D are only used for reception.

The main and the diversity front-end modules MFEM, DFEM each have two antenna termination configurations ATC1M, ATC2M, ATC1D, ATC2D and two grounding termination configurations GTC1M, GTC2M, GTC1D, GTC2D. The case of LTE communication in a high band, e.g. at band 3 (1710-1880 MHz) is considered in the following. In this case, the second main antenna switch AS2M and the second diversity antenna switch AS2D connect the corresponding high band main radiator RAD2M and high band diversity radiator RAD2D to the signal paths SP2M, SP2D, respectively. Further, to ease the impedance matching of the operating main and diversity radiators RAD2M, RAD2D over band 3, the second main grounding switch GS2M and the second diversity grounding switch GS2D connect the radiator grounding ports GP2M, GP2D to user-defined grounding termination circuits GTC2M, GTC2D.

Since the low band radiators RAD1M, RAD1D are not operating at this time, the first main antenna switch AS1M and the first diversity antenna switch AS1D can connect the low band radiator antenna ports AP1M, AP1D to user-defined antenna termination circuits ATC1M, ATC1D. Thereby, the detrimental interaction between the operating high band radiators RAD2M, RAD2D and the not operating low band radiators RAD1M, RAD1D is decreased. Thus, the total efficiency of the operating radiators RAD2M, RAD2D is improved. Additionally, the grounding switches GS1M, GS1D of the first main radiator RAD1M and of the first diversity radiator RAD1D could also switch the corresponding grounding port GP1M, GP1D to user-defined grounding terminations circuits GTC1M, GTC1D to further improve the performance of the operating radiators RAD2M, RAD2D.

Figure 4:
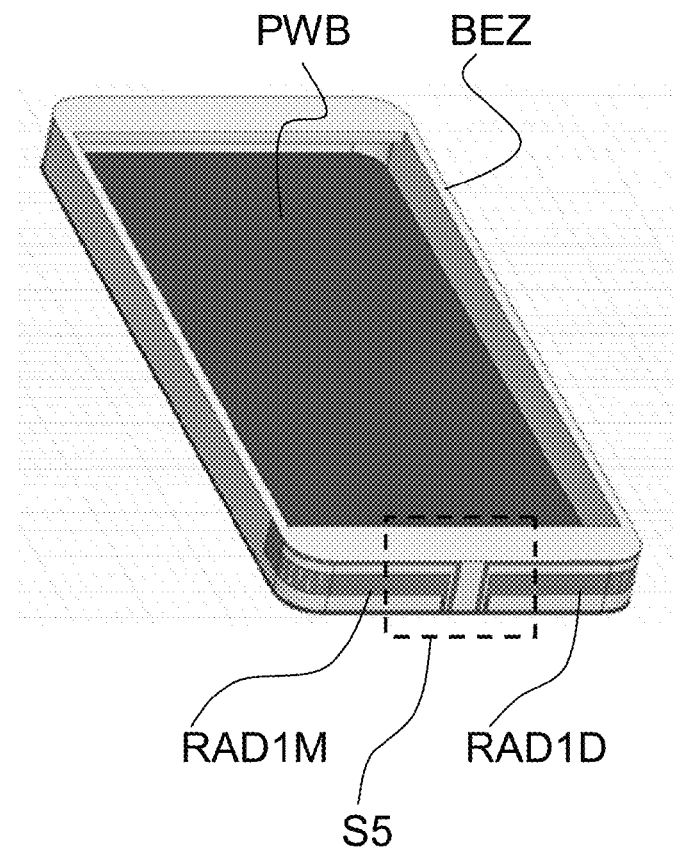
FIG. 4 shows a LTE radiator configuration.

FIG. 4 shows an example radiator configuration for LTE. The minimum requirement for LTE communication is a radiator configuration comprising two radiators RAD1M, RAD1D. The first radiator RAD1M is the main radiator which is used for reception and transmission. The second radiator RAD1D is the diversity radiator used only for reception. The second radiator RAD2D can also be referred to as MIMO Rx radiator. The main radiator RAD1M covers frequencies from approximately 700 to 2200 MHz, and the accompanying diversity radiator RAD1D covers the same frequencies.

Figure 5:
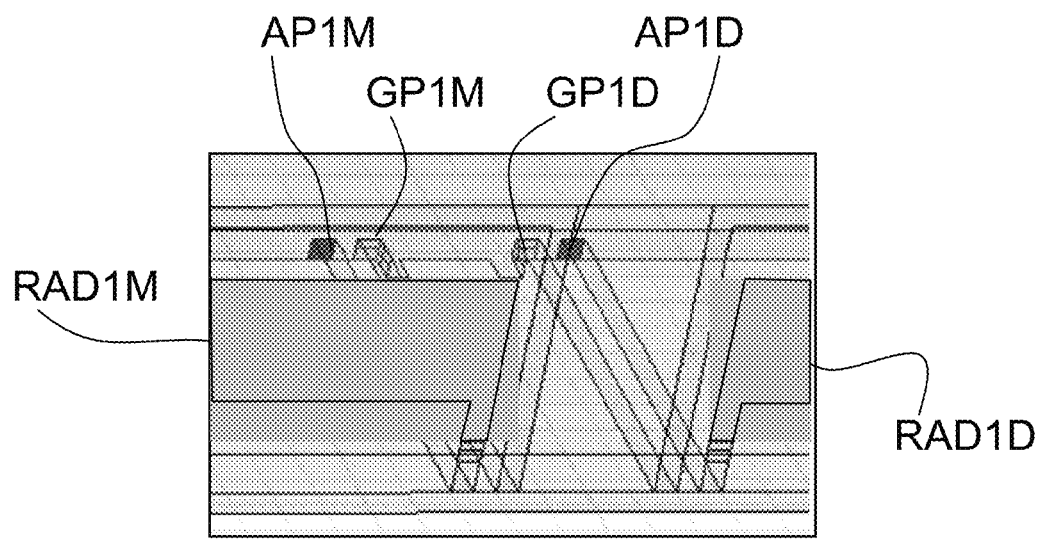
FIG. 5 shows a close-up illustration of the physical grounding ports and antenna ports of the radiators.

FIG. 5 shows a close-up illustration of the square S5 in FIG. 4. FIG. 5 shows the physical grounding ports GP1M, GP1D and antenna ports AP1M, AP1D for two radiators RAD1M, RAD1D. The radiators RAD1M, RAD1D as shown in FIG. 4 are implemented with flex-film assembly into a plastic bezel BEZ. The plastic bezel BEZ is shown as seethrough in FIG. 5 from the same perspective. The bezel BEZ surrounds a printed wiring board PWB which has typical smartphone PWB dimensions. The plastic bezel BEZ is a supporting part placed on top of the PWB. On top of the plastic bezel BEZ, i.e. on an outer edge of the bezel, the radiators RAD1M, RAD1D are printed on or implemented by a flex-film.

Figure 6:
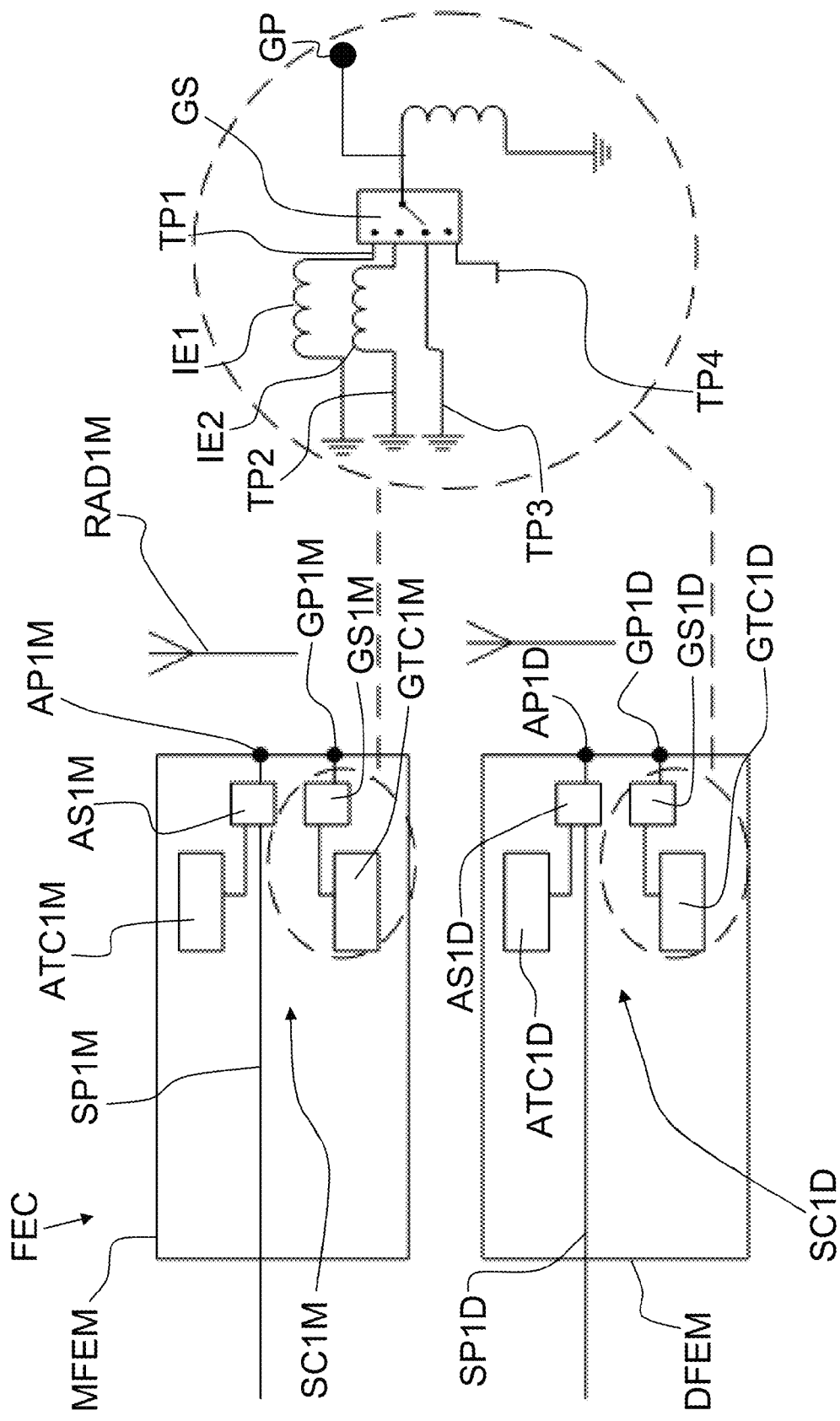
FIG. 6 shows a higher level block diagram of a ground termination circuit.

FIG. 6 is a higher level block diagram of the radiators RAD1M, RAD1D and the front-end circuit FEC as shown in FIG. 3. Again, the front-end circuit FEC comprises a main and a diversity front-end module MFEM, DFEM.

On the right side of FIG. 6, a more detailed diagram shows a possible realization of the grounding point GP, the grounding switch GS and the ground termination circuit GTC. The grounding switch GS is a SP4T switch. It can connect the grounding port GP to one of four termination paths TP1, TP2, TP3, TP4. The first and the second termination path TP1, TP2 each comprise discrete impedance elements IE1, IE2 representing different impedance termination states. The third termination path TP3 is short-terminated and the fourth termination path TP4 is an open state.

The actual termination paths TP of the ground termination circuit GTC can be implemented in several ways. A termination path TP can be realized by discrete components such as coil, capacitor, open line or short circuit termination. Alternatively, the termination path TP can be realized by an LCR network having arbitrary network topology which is implemented with discrete components or transmission lines. Preferably, the LCR network is tunable. A tunable LCR network comprises one or several of the discrete components or transmission lines which are tunable. Further, any termination formed by combinations of the above-described embodiments is possible as well.

Furthermore, impedance elements of filters that are part of a front-end module FEM anyway can be embodied for the ground termination circuit GTC as well.

Furthermore, the termination paths TP of the ground termination circuit GTC can be realized by a cascade and/or parallel configuration of additional switches. Here, each switch is followed either by an additional switch or by terminations as described above.

In the embodiment as shown in FIG. 6, the first termination path TP1 is embodied to match the radiator over band 17 (704-746 MHz). In this case, the SP4T switch GS is used to connect the grounding port GP to a coil IE1 with impedance 20 nH.

The second termination path TP2 also comprises a coil IE2. This termination path is specified to match the radiator to band 8.

Figure 7:
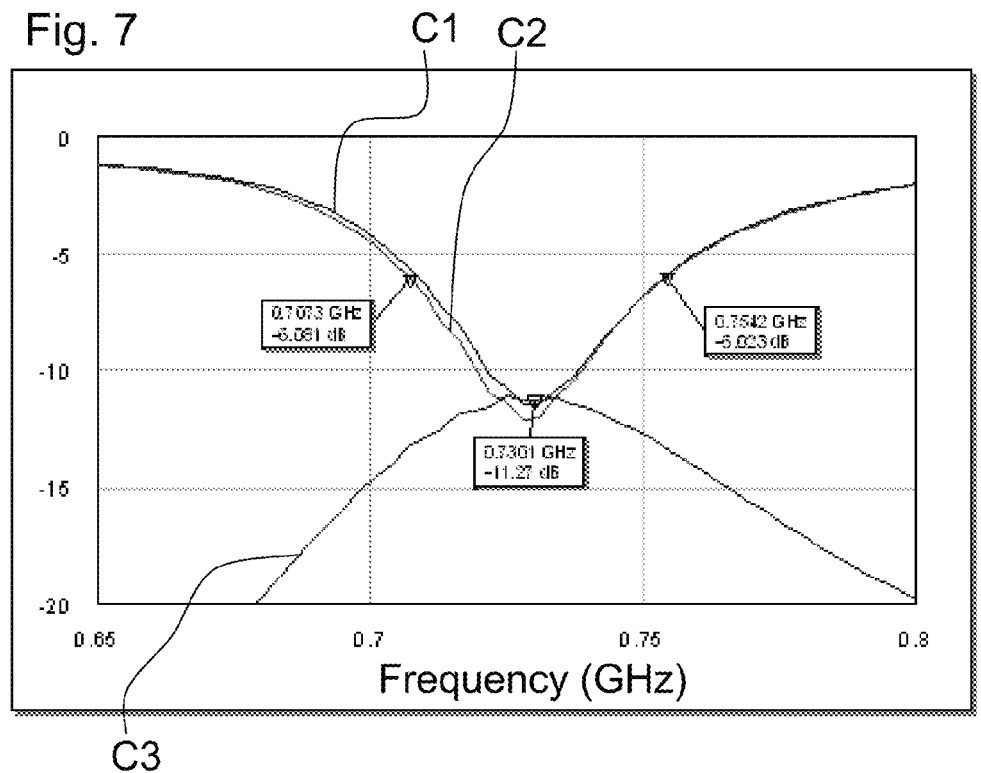
FIG. 7 shows the frequency characteristic for two radiators matched over band 17.

FIG. 7 shows the frequency characteristics of the two radiators RAD1M, RAD1D shown in FIGS. 4 to 6. Here, the two radiators RAD1M, RAD1D are matched over band 17. This means that the SP4T switch GS is connected to the first termination path TP1. Curve C1 shows the insertion loss for the main radiator RAD1M. Curve C2 shows the insertion loss for the diversity radiator RAD1D. FIG. 7 clearly shows that the radiators RAD1M, RAD1D are well matched over band 17. If the radiators would be directly connected to RF ground instead of connecting them to the proposed ground termination circuits GTC, the lowest frequency where these radiators RAD1M, RAD1D could be matched with the input matching circuit is approximately 800 MHz. In order to down-tune the radiators to 700 MHz, the ground termination circuit GTC implemented in the front-end circuit FEC must be utilized.

Curve C3 shows the port isolation or coupling between the main radiator RAD1M and the diversity radiator RAD1D.

Figure 8:
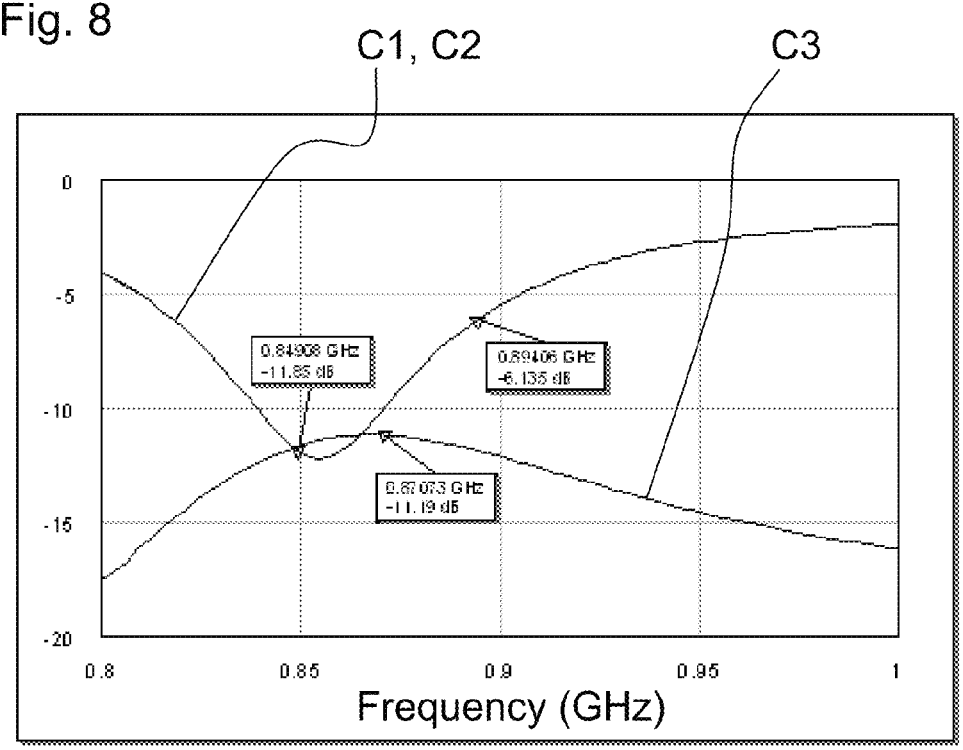
FIG. 8 shows the frequency characteristic for two radiators matched over the highest channels of band 5.

FIG. 8 shows the frequency characteristics of the two radiators RAD1M, RAD1D if they are matched over the highest channels of band 5. The curves C1 and C2 showing the insertion loss for the main radiator RAD1M and for the diversity radiator RAD1D are identical. Curve C3 shows the port isolation between the main radiator RAD1M and the diversity radiator RAD1D.

LIST OF REFERENCE SIGNS

FEC—front-end circuit
FEM—front-end module
SC—sub-circuit
RAD—radiator
AP—antenna port
GP—grounding port
AS—antenna switch
SP—signal path
ATC—antenna termination circuit
GS—grounding switch
GTC—grounding termination circuit
MFEM—main front-end module
DFEM—diversity front-end module
SC1M—first main sub-circuit
SC2M—second main sub-circuit
SC1D—first diversity sub-circuit
SC2D—second diversity sub-circuit
RAD1M—first main radiator
RAD2M—second main radiator
RAD1D—first diversity radiator
RAD2D—second diversity radiator
BEZ—bezel
PWB—printed wiring board
IE—impedance element
TP—termination path

The invention claimed is:

1. A front-end circuit, that is connectable to at least two radiators, the front-end circuit comprising:
    sub-circuits, each sub-circuit being associated to one radiator,
    wherein each sub-circuit comprises:
        a signal path;
        an antenna port that is electrically coupled to the signal path and connectable to the radiator;
        a grounding port that is connectable to the radiator;
        a ground termination circuit;
        a grounding switch that is electrically coupled to the grounding port and to the grounding termination circuit; and
        an antenna termination circuit and an antenna switch that is electrically connected to the antenna port,
        wherein the antenna switch can connect the antenna port to one of the signal path or the antenna termination circuit,
        wherein the grounding termination circuit allows adjusting the impedance for an operating radiator, and
        wherein the antenna termination circuit allows choosing from several possibilities to terminate the radiator such that the antenna termination circuit allows adjusting the impedance of an unused, non-operation radiator.

2. The front-end circuit according to claim 1, wherein the ground termination circuit comprises at least two termination paths, each termination path has a different impedance and the grounding switch can connect the grounding port to one of the termination paths respectively at a given time so that the radiator has different impedances for different configurations of the grounding switch.

3. The front-end circuit according to claim 1, wherein the ground termination circuit comprises an impedance element selected from: a resistance element, a capacitive element, an inductive element and a LCR-circuit.

4. The front-end circuit according to claim 3, wherein the ground termination circuit provides one or more individually selectable states chosen from an open state and a short-terminated state and an individual-terminated state, and
    wherein in the individual-terminated state the ground switch electrically connects the impedance element to the grounding port.

5. The front-end circuit according to claim 1, wherein the ground termination circuit comprises an LCR network, implemented with discrete components or transmission lines.

6. The front-end circuit according to claim 5, wherein the LCR network is tunable.

7. The front-end circuit according to claim 1, wherein the front-end circuit comprises impedance elements or filters, and
    wherein the impedance elements or filters are integrated in the ground termination circuit.

8. The front-end circuit according to claim 1, wherein the ground termination circuit comprises additional switches in a cascade or parallel configuration,
   wherein each switch is followed by another switch or by one of an open-terminated path, a short-terminated path or an individual-terminated path, and
   wherein in the individual-terminated path an impedance element is electrically connected to the grounding port.

9. The front-end circuit according to claim 1, for use in a multiband communication device.

10. The front-end circuit according to claim 1, that is specified for LTE communication.

11. A method for driving a front-end circuit of claim 1, the method comprising the steps of:
   determining at least one active radiator;
   electrically connecting the grounding port which is coupled to the active radiator to a termination path of the ground termination circuit;
   determining at least one inactive radiator; and
   electrically connecting the antenna port which is coupled to the inactive radiator to a termination path of the antenna termination circuit.

12. The method according to claim 11, further comprising the steps of:
   consulting a mode table regarding optimal antenna performance;
   electrically connecting the grounding port which is coupled to the active radiator to a termination path of the ground termination circuit according to the mode table via selecting and setting the according switching state of the respective grounding switch; and
   electrically connecting the antenna port which is coupled to the inactive radiator to a termination path of the antenna termination circuit according to the mode table via selecting and setting the according switching state of the respective antenna switch.

13. The method according to claim 12, further comprising the step of:
   electrically connecting the grounding port which is coupled to the inactive radiator to a termination path of the ground termination circuit according to the mode table via selecting and setting the according switching state of the respective grounding switch.

* * * * *